3,812,176
METHYLENE AND OXYMETHYLENE
BIS-ESTER PRODUCTION
Seymour J. Lapporte, Orinda, and William G. Toland,
San Rafael, Calif., assignors to Chevron Research Company, San Francisco, Calif.
No Drawing. Continuation-in-part of application Ser. No. 221,415, Jan. 24, 1972, now Patent No. 3,720,706. This application Oct. 30, 1972, Ser. No. 302,373
The portion of the term of the patent subsequent to Mar. 13, 1990, has been disclaimed
Int. Cl. C07c 67/00
U.S. Cl. 260—494                           11 Claims

ABSTRACT OF THE DISCLOSURE

Methylene and oxymethylene bis-esters, e.g.,

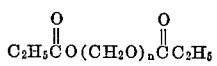

wherein $n$ is 1 to 5, are produced by the reaction of a carboxylic acid, ethylene, carbon monoxide and formaldehyde in the presence of a rhodium catalyst and an iodide or bromide promoter. In a preferred modification of the process, methylene and oxymethylene bis-alkanoates are produced directly from ethylene, carbon monoxide, water and formaldehyde in the presence of the rhodium catalyst and the iodide or bromide promoter.

CROSS-REFERENCE TO RELATED APPLICATION

This application is a continuation-in-part of copending U.S. Ser. No. 221,415, filed Jan. 24, 1972, now U.S. Pat. 3,720,706.

BACKGROUND OF THE INVENTION

Processes for the production of methylene and oxymethylene bis-esters are known in the art. For example, Tomiska and Spousta, *Angew Chem.*, Int. Ed., *1*, 211 (1962) disclose the preparation of methylene and oxymethylene bis-acetates from acetic anhydride and trioxane in the presence of perchloric acid.

Methylene and oxymethylene bis-esters are useful for preserving moist grain during storage, as disclosed by French Pat. No. 70/37,979 of Kensler et al., granted July 12, 1971.

SUMMARY OF THE INVENTION

It has now been found that methylene and oxymethylene bis-esters are produced by the reaction of (1) a carboxylic acid, (2) ethylene, (3) carbon monoxide and (4) formaldehyde in the presence of a catalyst system comprising a rhodium compound and an iodide or bromide promoter. By way of illustration, the reaction of propionic acid, ethylene, carbon monoxide and formaldehyde in the presence of rhodium dicarbonyl chloride dimer and ethyl iodide produces a good yield of methylene bis-propionate.

In some modifications of the process of the invention, a propionic acid reactant is generated *in situ* by the reaction of ethylene, water and carbon monoxide in the presence of the rhodium catalyst and iodide or bromide promoter so that the methylene and oxymethylene bis-propionates are produced directly from ethylene, carbon monoxide, water and formaldehyde.

DESCRIPTION OF PREFERRED EMBODIMENTS

The catalyst system

The catalyst system employed in the process of the invention comprises a rhodium compound and an iodide or bromide promoter.

Suitable rhodium compounds include rhodium halides, such as $RhCl_3$, $RhBr_3$ and $RhI_3$; rhodium carbonyl halides, such as $Rh_2(CO)_4Br_2$, $Rh_2(CO)_4Cl_2$ and $Rh_2(CO)_4I_2$; and $Rh_2O_3$. Other suitable rhodium compounds are rhodium coordination compounds containing monodentate ligands, such as carbon monoxide, halides, amines, organophosphines, organoarsines and/or organostibines, i.e., rhodium compounds such as $Rh[(C_6H_5)_3P]_2(CO)I$ and $RhCl(CO)[(C_6H_5)_3As]_2$.

Suitable iodide promoters include iodine, hydrogen iodide and alkyl iodides of 1 to 6 carbon atoms and 1 to 3 iodide groups such as methyl iodide, ethyl iodide, methylene diiodide, iodoform, and isopropyl iodide.

Suitable bromide promoters include bromine, hydrogen bromide, and alkyl bromides of 1 to 6 carbon atoms and 1 to 3 bromide groups such as methyl bromide, methylene dibromide, isopropyl bromide and bromoform.

Certain rhodium compounds such as $RhI[(C_6H_5)_3P]_3$, $RhI_3$ or $RhBr_3$ incorporate iodide and/or bromide moieties so that a separate iodide or bromide promoter may not be required.

Molar ratios of the iodide or bromide promoter to the rhodium component of the catalyst system in the range of 1:1 to 2500:1 are generally suitable. However, the preferred molar ratios of iodide or bromide promoter to rhodium component are about 3:1 to 300:1 and the most preferred molar ratios are about 5:1 to 100:1.

Concentrations of the rhodium compound of the catalyst system in the reaction medium between $10^{-6}$ moles/liter and $10^{-1}$ moles/liter, are normally employed, with the preferred range being $10^{-4}$ moles/liter to $10^{-2}$ moles/liter. Higher concentrations even to the extent of 1 mole/liter may, however, be used if desired.

The concentration of the iodide or bromide promoter portion of the catalyst system in the reaction medium may vary widely over the broad concentration range of $10^{-6}$ moles/liter to 18 moles/liter, based on iodide or bromide atom. In the process of this invention, however, the preferred concentration range of promoter is $10^{-4}$ moles/liter to 2 moles/liter.

Although the catalyst system is generally employed as a homogeneous catalyst system, the catalyst system may be dispersed on inert supports, such as silica or alumina, to provide a heterogeneous catalyst system.

The catalyst system of a rhodium compound and an iodide promoter is a known catalyst combination and is disclosed, for example, in U.S. 3,579,552 of Craddock et al., issued May 18, 1971. A variety of rhodium compounds and iodide promoters, as well as the preparation of the catalyst system, is disclosed in U.S. 3,579,552. The disclosure of U.S. 3,579,552 is hereby incorporated by reference.

The carboxylic acid reactant

The process of this invention is broadly applicable to any organic compound containing at least one carboxylic acid group. Suitable carboxylic acid reactants include carbocyclic aromatic carboxylic acids, such as benzoic acid, p-chlorobenzoic acid, terephthalic acid and naphthoic acid; heterocyclic carboxylic acids, such as picolinic acid, furoic acid and thiophenic acid; and aliphatic carboxylic acids, such as oleic acid, adipic acid, trichloroacetic acid and cyclohexane carboxylic acid.

One class of preferred carboxylic acid reactants are hydrocarbon carboxylic acids represented by the formula (I)

$$RCO_2H \tag{I}$$

wherein R is an alkyl group of from 1 to 10 carbon atoms, preferably n-alkyl of from 1 to 6 carbon atoms, an alkaryl group of from 7 to 10 carbon atoms, an aralkyl group of from 7 to 10 carbon atoms or phenyl. Illustrative carboxylic acids of formula (I) therefore include alkanoic acids, such as acetic acid, propionic acid, isobutyric acid, butyric acid, hexanoic acid, 4-methylheptanoic acid and decanoic acid, and aromatic acids such as benzoic acid, toluic acid, phenylacetic acid, 2-phenylbutyric acid, 2,4-dimethylbenzoic acid and 3-tolylbutyric acid. Preferred carboxylic acids of formula (I) are alkanoic acids, especially linear alkanoic acids of 2 to 4 carbon atoms, i.e., acetic acid, propionic acid and n-butyric acid.

When propionic acid is employed as the carboxylic acid reactant, it is suitably provided to the reaction mixture as the preformed material or is generated *in situ* in the reaction mixture. A preferred method of generating the propionic acid is by reacting ethylene, carbon monoxide and water in the presence of the catalyst system of the invention. As discolsed in U.S. 3,579,552, cited above, propionic acid may be formed by the reaction of ethylene, carbon monoxide and water in the presence of the catalyst system employed in the process of the invention.

The formaldehyde reactant

The formaldehyde reactant is suitably introduced in the pure form or produced *in situ*, e.g., from paraformaldehyde or trioxane. In the modification of the process wherein water is employed as a reactant (wherein propionic acid reactant is generated *in situ* from ethylene, carbon monoxide and water), the formaldehyde is suitably introduced as an aqueous solution.

The carbon monoxide reactant

The carbon monoxide is employed in the process at partial pressures of from about 1 p.s.i.a. to about 5000 p.s.i.a., although partial pressures of about 25 p.s.i.a. to 1000 p.s.i.a. are preferred Carbon monoxide streams containing inert impurities such as carbon dioxide, hydrogen, methane, nitrogen and paraffinic hydrocarbons having 1 to 4 carbon atoms may be employed, if desired.

The methylene and oxymethylene ester products

The methylene and oxymethylene di- or bis-esters produced by the process of the invention are represented by the formula (II)

$$R\overset{O}{\underset{\|}{C}}O(CH_2O)_n\overset{O}{\underset{\|}{C}}CH_2CH_3 \quad (II)$$

wherein R has the same significance as defined in formula (I) and $n$ is a whole integer from 1 to 5 inclusive, preferably 1 or 2.

In terms of the carboxylic acid reactant represented by formula (I), the formaldehyde reactant, carbon monoxide, ethylene, the overall net reaction involved in the process of the invention is depicted by the following equation (1):

$$R\overset{O}{\underset{\|}{C}}OH + nCH_2O + CO + H_2C{=}CH_2 \longrightarrow$$

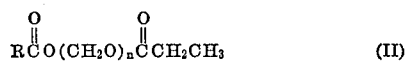
(1)

By way of illustration (1) the reaction of acetic acid, $CH_2O$, CO, and ethylene according to the process of the invention produces an acetate propionate diester of the formula

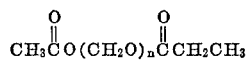

(2) the reaction of propionic acid, $CH_2O$, CO and ethylene produces propionate esters of the formula

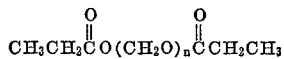

and (3) the reaction of benzoic acid, $CH_2O$, CO and ethylene produces benzoate propionate diesters of the formula

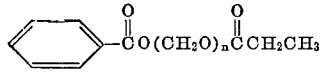

In the modification of the process wherein propionic acid reactant is generated *in situ* from ethylene, the overall net reaction is depicted by the following equation:

$$2H_2C{=}CH_2 + 2CO + H_2O + nCH_2O \longrightarrow$$

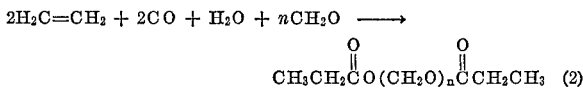
(2)

The reactant molar ratios

The reactants employed in the process of the invention are generally contacted in the molar ratios defined by the stoichiometry of equation (1). That is, the molar ratio of carboxylic acid to ethylene is substantially equimolar (e.g., 1.5:1 to 1:1.5) and the molar ratio of carbon monoxide to ethylene is substantially equimolar. The amount of formaldehyde reactant depends in part upon the number of oxymethylene linkages $(CH_2O)$ desired in the product. When a product comprising principally methylene bis-esters (wherein $n=1$) is desired, the molar ratio of formaldehyde to ethylene is substantially equimolar (e.g., 1.5:1 to 1:1.5). When a product containing oxymethylene bis-esters (wherein $n>1$) is desired, the molar ratios of formaldehyde to ethylene of from about 1:1.5 to 5:1 are employed. However, an excess of any reactant is suitably employed. For example, in some modifications of the process, it is desirable to employ excess ethylene or carboxylic acid as reaction diluents. Accordingly, molar ratios of carboxylic acid to ethylene of from 10:1 to 1:10, molar ratios of carbon monoxide to ethylene of from 10:1 to 1:2 and molar ratios of formaldehyde to ethylene of 5:1 to 1:5 are satisfactorily employed.

In the modification of the reaction wherein the propionic acid reactant is generated *in situ* from ethylene, carbon monoxide and water, the molar ratio of water to ethylene is generally about 2:1 to 1:4 although a molar ratio of about 1:2 (as required by the stoichiometry of equation 2) is preferred. Suitable molar ratios of carbon monoxide to ethylene are about 10:1 to 1:2, preferably 1.5:1 to 1:1.5 and suitable molar ratios of formaldehyde to ethylene are 5:1 to 1:5, preferably 0.2:1 to 2:1.

Reaction conditions

The process of the invention is conducted in a fluid phase, i.e., either in the gaseous or liquid phase, in the presence or in the absence of an inert reaction diluent. Suitable inert normally-liquid diluents are hydrocarbons free from aliphatic unsaturation such as hexane, heptane, octane, decane, cyclohexane, benzene, toluene and xylene. Suitable normally-gaseous diluents are nitrogen, hydrogen, argon, helium, methane and ethane. As indicated above, in some modifications of the process, a portion of the ethylene or carboxylic acid reactant suitably serves as the reaction diluent. When diluent is employed up to about 50 moles per mole of ethylene reactant are satisfactory. The process is suitably conducted in an inert reaction environment so that the presence of reactive materials such as oxygen is desirably avoided.

The process of the invention is carried out by intimately contacting the ethylene reactant, the carboxylic acid reactant, carbon monoxide and formaldehyde in the presence of the rhodium catalyst and the iodide or bromide promoter. A variety of procedures can be employed for contacting the reaction components with the catalyst system. In one modification, the entire amounts of ethylene, carboxylic acid reacant, formaldehyde, carbon monoxide and catalyst components are charged to an autoclave or similar pressure reaction and maintained at reaction conditions for the desired reaction period. In another modification, one reaction component is added to the other reaction components in increments, as by adding the formaldehyde to a mixture of the other reaction components and catalyst system. In yet another modification an active catalyst system is initially preformed by contacting at elevated temperature the rhodium compound, carbon monoxide and iodide or bromide promoter in a suitable solvent and subsequently adding the remaining reaction components. In certain modifications wherein a supported catalyst system is employed, the reaction is effected in a continuous manner as by passing a mixture of the reaction components through a reactor in which the supported catalyst system is maintained.

In the modifications of the reaction wherein propionic acid is generated *in situ*, the reaction is suitably conducted by contacting ethylene, carbon monoxide and water in the presence of the catalyst system and subsequently adding the formaldehyde reactant and, if desired, additional ethylene and carbon monoxide reactants. Alternatively, it is also suitable to initially contact the entire amounts of reaction mixture components in the presence of the catalyst system.

The process of the invention is conducted at moderate temperatures and pressures. Suitable reaction temperatures varying from about 50° C. to 300° C. are satisfactory and reaction temperatures varying from about 125° C. to 225° C. are preferred. The process is conducted at or above atmospheric pressure, and pressures from about 1 atmosphere to about 100 atmospheres are satisfactory.

At the conclusion of the reaction, the product mixture is separated and the product is recovered by conventional means such as fractional distillation. Unreacted reaction components and intermediates, e.g., alkanoic acids, are suitably recycled for additional conversion.

Example 1.—Preparation of methylene bis-propionate from ethylene, carbon monoxide, formaldehyde and propionic acid A 1-liter Hastelloy C magnetically stirred autoclave was charged with 1 mole of propionic acid, 1 mole of formaldehyde (as trioxane), 0.001 mole of [Rh(CO)$_2$Cl] dimer and 0.05 mole of ethyl iodide, and then flushed with nitrogen and carbon monoxide. Carbon monoxide (1.36 moles) and 1.2 moles of ethylene were then added to the autoclave. The total pressure at 25° C. was about 1000–1200 p.s.i.a.

The autoclave was maintained at 150° C. until the gas uptake stopped (5 hours). The autoclave was cooled to room temperature and vented. The product mixture was analyzed by infrared spectroscopic and gas chromatographic techniques. The conversion of ethylene was 37% and the yield of methylene bis-propionate.

based on converted ethylene was 95.7%. A small amount of oxymethylene bis-propionate was found in the product mixture.

A repeat of Example 1 with paraformaldehyde as the formaldehyde source gave essentially identical results.

Example 2.—Preparation of methylene bis-propionate from ethylene, carbon monoxide, and formaldehyde and water By a procedure similar to Example 1, a mixture of 0.4 mole of water, 1 mole of formaldehyde (as trioxane), 0.001 mole of [Rh(CO)$_2$Cl] dimer, 0.05 mole of ethyl iodide, 1.34 moles of ethylene and 1.34 moles of carbon monoxide was reacted in a stirred autoclave for 19 hours at 125° C. Analysis of the product mixture indicated an ethylene conversion of 38.7% and a 27% yield of propionic acid and an 88% yield of methylene bis-propionate based on converted ethylene.

Example 3

A 1-liter Hastelloy C rocking autoclave was charged with 0.5 mole of propionic acid, 0.5 mole of formaldehyde, 0.0005 mole of [Rh(CO)$_2$Cl] dimer and 0.05 mole hydrogen bromide, and then flushed with nitrogen and carbon monoxide. Carbon monoxide (1 mole) and 1 mole of ethylene were then added to the autoclave.

The autoclave was maintained at 150° C. and 1100 p.s.i. of 1:1 ethylene-CO for 16 hours. The product mixture was analyzed by infrared spectroscopy. The conversion of propionic acid was 100% and the yield of methylene bis-propionate, based on converted propionic acid, was 69% and the yield of propionic anhydride, based on converted propionic acid, was 19%.

We claim:

1. A process of producing methylene and oxymethylene bis- or di-carboxylic acid esters by reacting in liquid or gaseous phase (1) a carboxylic acid of the formula RCO$_2$H, wherein R is alkyl of 1 to 10 carbon atoms, hydrocarbon alkaryl of 7 to 10 carbon atoms, hydrocarbon aralkyl of 7 to 10 carbon atoms or phenyl, (2) ethylene, (3) formaldehyde and (4) carbon monoxide in the presence of a catalytic amount of a rhodium compound and a bromide promoter, the molar ratio of carboxylic acid to ethylene being from about 10:1 to 1:10, the molar ratio of carbon monoxide to ethylene being from about 10:1 to 1:2, the molar ratio of formaldehyde to ethylene being from about 5:1 to 1:5, at a temperature of about 50° C. to 300° C. and at an initial carbon monoxide pressure of from 1 p.s.i.a to 5000 p.s.i.a.

2. The process of claim 1 wherein R is alkyl of 1 to 10 carbon atoms.

3. The process of claim 1 wherein the bromide promoter is bromine, hydrogen bromide or an alkyl bromide of 1 to 6 carbon atoms and 1 to 3 bromide groups.

4. The process of claim 1 wherein the formaldehyde is produced *in situ* from paraformaldehyde or trioxane.

5. The process of claim 1 wherein the rhodium compound is a rhodium halide or a rhodium carbonyl halide.

6. The process of claim 1 wherein the carboxylic acid is propionic acid.

7. The process of claim 1 wherein the carboxylic acid is propionic acid, the rhodium catalyst is a rhodium halide or a rhodium carbonyl halide and the promoter is hydrogen bromide.

8. The process of claim 7 wherein the propionic acid is generated *in situ* from an ethylene, carbon monoxide and water by providing water as an additional reactant, the molar ratio of water to ethylene being from about 2:1 to 1:4.

9. The process of claim 8 wherein the promoter is bromine, hydrogen bromide, or alkyl bromide of 1 to 3 carbon atoms and 1 to 3 bromide groups.

10. The process of claim 9 wherein the rhodium compound is a rhodium halide or a rhodium carbonyl halide.

11. The process of claim 10 wherein the formaldehyde is produced *in situ* from paraformaldehyde or trioxane.

References Cited

UNITED STATES PATENTS 3,081,357    3/1963    Alderson et al. _____ 260—494

VIVIAN GARNER, Primary Examiner

U.S. Cl. X.R.

260—295 R, 332.2 C, 347.5, 410.6, 468 CB, 469, 475 N, 476 R, 485 G, 487, 533 A, 546